United States Patent [19]

Wang

[11] Patent Number: 5,178,483
[45] Date of Patent: Jan. 12, 1993

[54] COUPLING DEVICE

[76] Inventor: Wen-Chang Wang, No. 208-13, Shang Lun Tsun, Jen Te Hsiang, Tainan Hsien, Taiwan

[21] Appl. No.: 797,914

[22] Filed: Nov. 26, 1991

[51] Int. Cl.⁵ .............................................. B25G 3/00
[52] U.S. Cl. .................................. 403/286; 403/258; 403/260; 403/338
[58] Field of Search ............... 403/260, 258, 286, 287, 403/338

[56] References Cited

U.S. PATENT DOCUMENTS

| 3,434,366 | 3/1969 | Raso et al. | 403/260 X |
| 4,337,406 | 6/1982 | Binder | 403/260 X |
| 4,811,616 | 3/1989 | Henderson | 403/260 X |

Primary Examiner—Andrew V. Kundrat
Attorney, Agent, or Firm—Bacon & Thomas

[57] ABSTRACT

A device for coupling the detachable connection between a driving shaft of an engine and a driven cylindrical hub of a generator wherein the engine and generator are provided with collar-members having corresponding annular flanges which are detachably clamped together by a ring formed from two pivotal clamping halves.

1 Claim, 2 Drawing Sheets

COUPLING DEVICE

BACKGROUND OF THE INVENTION

This invention relates to a coupling device, and more particularly to a combined clamping and coupling device for an engine and associated generator.

Conventionally, portable electricity generators are widely used in outdoor activities in locations without a supply of electricity. For example, in camping environments, markets, circus fields and the like. Known portable generators usually comprise an internal combustion engine having an output or driving shaft connected to a driven shaft of a generator by a coupling. Such a coupling includes a tapered bore extending inwardly from an outer end of the output shaft of the engine and a cone head formed at the outer end of the driven shaft of the generator. The cone head is insertable into the tapered bore for frictionally interlocking the shafts together.

It is found that both the engine and generator should be preassembled on the same base in the factory producing the generator so that the tapered bore and cone head can be precisely and tightly joined together. In transporting this assembly, a heavy bump or vibration may cause the shafts of the engine and generator to deform or detach from each other.

SUMMARY OF THE INVENTION

It is therefore a primary object of the present invention to provide a clamping device for connecting the ends of driving and driven shafts, wherein the device is relatively simple in construction and operation.

Another object of the invention is to provide a coupling device for connecting a driving shaft to a driven shaft which provides a means for detaching the driving shaft from the driven shaft.

DETAILED DESCRIPTION OF THE PREFERRED EMBODIMENT

Figure 1:
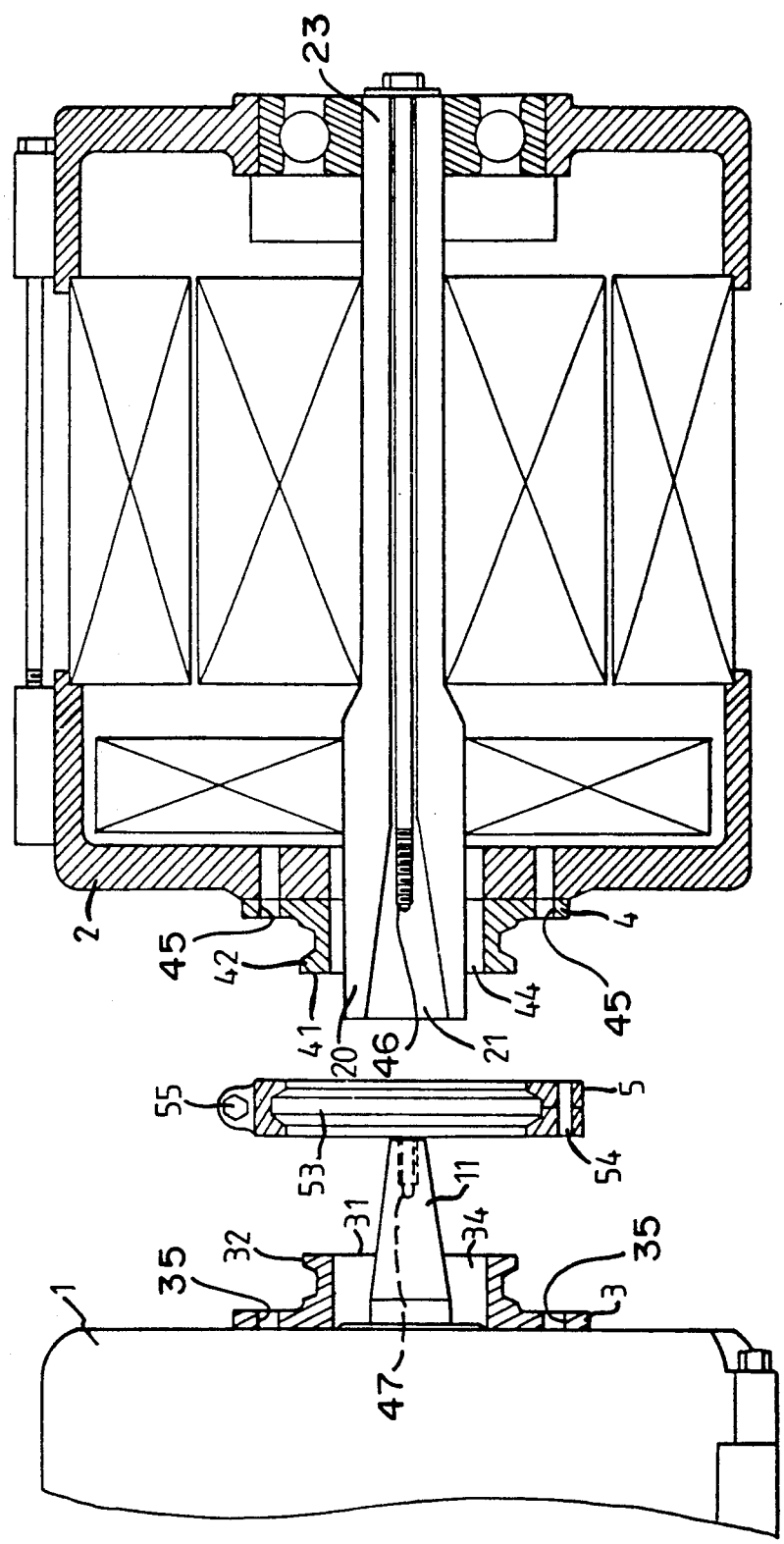
FIG. 1 is a longitudinal sectional view of the coupling device of the invention showing the manner in which it is used for coupling the driving and driven shafts of an engine and a portable generator.

Referring to the drawings, and more particularly to FIG. 1, a coupling device according to the present invention is provided for maintaining torque transmission from an internal combustion engine 1 to an electricity generator 2. The engine 1 has a collar member 3 secured to an outer side of a casing thereof by a plurality of bolts or other mechanical fasteners (not shown) through a plurality of corresponding holes 35 formed in collar member 3. An axial shaft 11 extends from a cylindrical chamber 34 defined by collar member 3, the latter also being provided with an annular flange 32 formed at an outer portion thereof and terminating in a flat end wall 31. The axial shaft 11 of engine 1 is provided with a tapered end portion.

The generator 2 also has a collar member 4 secured to an outer side of a casing thereof by plurality of bolts or other mechanical fasteners (not shown) through a plurality of holes 45 formed in collar member 4. A cylindrical hub 20 of a driven shaft 23 extends from a cylindrical chamber 44 defined by the collar member 4, the latter also being provided with an annular flange 42 formed at an outer portion thereof and which flange 42 terminates in a flat end wall 41. The cylindrical hub 20 has a tapered axial bore 21 in its outer end for receiving the tapered end of axial shaft 11.

Figure 2:
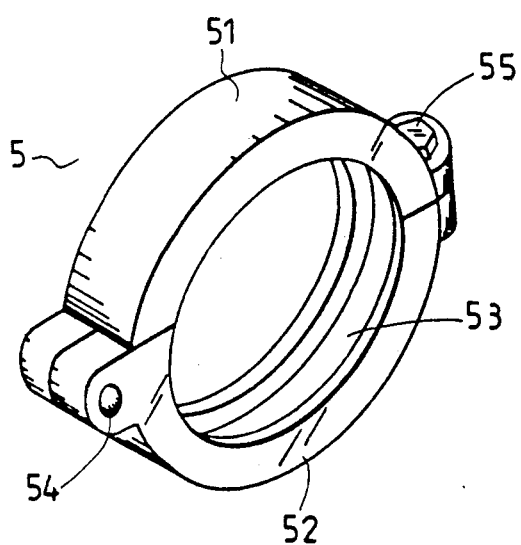
FIG. 2 is a perspective view of a clamping ring used in the coupling device shown in FIG. 1.

A clamping ring 5 is provided for detachably interlocking the driving shaft 11 and driven shaft 23 of engine 1 and generator 2, respectively. As shown in FIG. 2, clamping ring 5 comprises two clamping halves 51, 52 of which one pair of corresponding ends are pivotally secured together with a pin 54 and the other pair of corresponding ends are provided with a bolt lock 55. Clamping ring 5 has an annular v-shaped groove 53 which defines a gripping face.

In assembly, axial shaft 11 of engine 1 is inserted into tapered bore 21 of cylindrical hub 20. An internal threaded shank 46 extending axially within hub 20 is engaged with a correspondingly threaded axial hole 47 formed in the outer tapered end of shaft 11. Thus, the tapered end of axial shaft 11 is tightly secured within the tapered bore 21, and this serves to dispose the flat end wall 31 of collar member 3 in abutting engagement against the flat end wall 41 of collar member 4. Flanges 32, 42 of collars members 3, 4 are then clamped by surrounding flanges 32, 42 with clamping ring 5 so that the same are gripped by the gripping face defined by annular v-shaped groove 53 of ring 5. Thereafter, bolt lock 55 may be tightened to apply clamping force around flanges 32, 42, thus tightly connecting collar members 3 and 4 together.

Tapered shaft of engine 1 is removed from hub 20 of generator 2 by first loosening bolt lock 55 to permit one clamping half 51 to pivot open from the other clamping half 52, thereby disconnecting collar members 3, 4 from each other. The cylindrical hub 20 may then be rotated in a reverse direction to disengage threaded shank 46 from threaded axial hole 47.

I claim:

1. A coupling device for detachably clamping a driving shaft of an engine to a driven shaft of an electricity generator comprising:
   a) a tapered end member carried at the outer end of the engine driving shaft;
   b) a first flange member surrounding the tapered end member;
   c) a cylindrical hub carried at the outer end of the driven shaft of the generator, the cylindrical hub including a tapered axial bore for receiving the tapered end member of the driving shaft;
   d) a second flange member surrounding the hub; and
   e) a clamping ring including two clamping halves having a first pair of corresponding ends pivotally connected together by a pin and a second pair of corresponding ends detachably connected together by a bolt lock, and an annular groove for surrounding and clamping the first and second flange members together when the tapered end member of the driving shaft is received within the tapered axial bore of the cylindrical hub to permit torque transmission between the driving shaft and the driven shaft.

* * * * *